Sept. 10, 1935.    W. B. KLEMPERER    2,014,357
RECORDING MICROMETER GAUGE
Filed March 11, 1931    3 Sheets-Sheet 1

Inventor
Wolfgang B. Klemperer.
By
Attorney

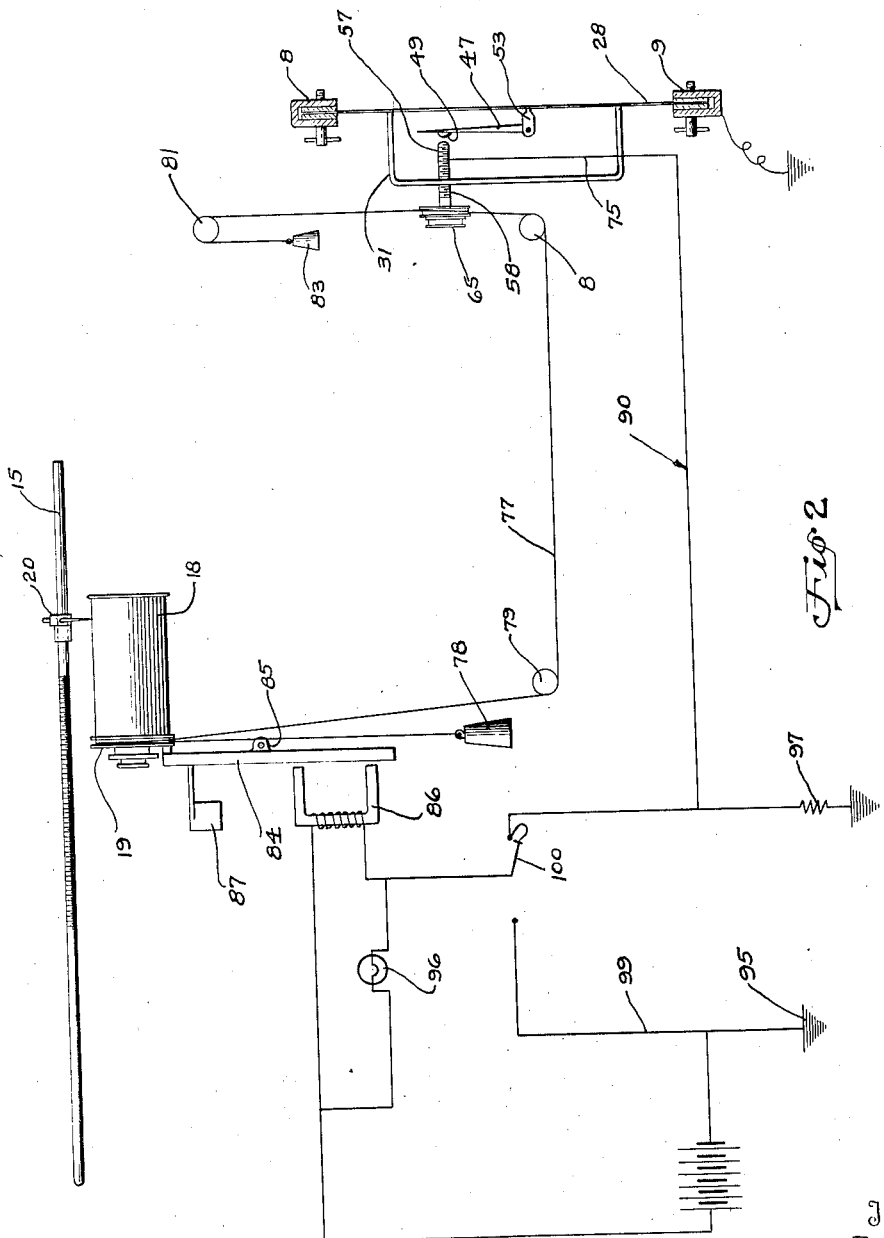

Sept. 10, 1935.  W. B. KLEMPERER  2,014,357
RECORDING MICROMETER GAUGE
Filed March 11, 1931   3 Sheets-Sheet 3

Inventor
Wolfgang B. Klemperer
By Bee & Bush
Attorneys

Patented Sept. 10, 1935

2,014,357

UNITED STATES PATENT OFFICE 2,014,357

RECORDING MICROMETER GAUGE

Wolfgang B. Klemperer, Akron, Ohio, assignor to Goodyear-Zeppelin Corporation, Akron, Ohio, a corporation of Delaware Application March 11, 1931, Serial No. 521,705

5 Claims. (Cl. 265—2)

The invention relates to the measuring of microscopical movements, especially for the purpose of testing materials, and it has particular relation to an apparatus for determining the stress and strain characteristics of metal.

One object of the invention is to provide an apparatus particularly adapted to determine graphically the relation between the stress or load applied to a piece of material, and the strain which the material undergoes.

Another object of the invention is to provide an apparatus that will record in greatly magnified values, the history of minute geometrical variations in material subjected to stress and strain, and especially will record changing elastic and plastic characteristics near the yield point of the material.

It is very desirable to determine certain properties or characteristics of metal before using it in constructions whose strength and durability must be carefully calculated. Particularly, it is important that the elastic limit and yield point, and the rate of yielding of the metal be known. While such characteristics of metal in general have been determined prior to this invention, the latter provides a very simple, fool-proof construction for determining them very accurately, quickly, and inexpensively, and especially well on small specimens of thin sheet metal.

In one application of the invention, a test bar specimen in the form of a strip of metal of predetermined cross-sectional area is disposed between relatively movable jaws of an apparatus for subjecting the metal to a varying tensile force. Ordinarily, in certain material-testing machines, this is effected by retaining one of the jaws in a stationary position and moving the other by means of hydraulic pressure. As tensile force is applied to the metal, it is indicated on a pressure indicator and simultaneously a recording instrument, such as a stylus, is moved in a given direction, according to the pressure of the fluid. The stylus is so disposed as to be movable upon the surface of a rotatable drum during the application of a predetermined tensile force to the metal being tested. For the purpose of measuring the elongation of the metal, a device is provided which is secured directly to a predetermined length of the specimen between the jaws, and, as it elongates, controls the movement of the chart or rotation of the drum in such manner that the line drawn by the stylus shows a function of the tensile force and the length of the tested strip of metal. One example of the new device for engaging the test specimen comprises a small frame having sharp blades engaging opposed edges of the test strip of metal, thereby suspending the frame on the latter, and a needle point fixed to one end of a bell crank lever pivoted to the frame, which engages the surface of the metal test strip at a predetermined distance from the blades. This arrangement of parts provides a movable needle point engaging the metal being tested, which causes a rotational movement of the bell crank when the metal is elongated. The opposite end of the bell crank, preferably the longer lever arm, constitutes one contact of an electrical switch, and the other contact of the switch comprises a micrometer screw threaded through a portion of the frame but insulated therefrom by means of a suitable material. The screw projects outwardly of the framework, and is provided with a small grooved pulley rigidly secured thereto. When the metal is elongated or stretched, the contact of the bell crank is moved away from the contact on the screw, but it is apparent that rotation of the pulley will immediately cause the contact on the screw to be moved against the contact on the bell crank, the screw mechanism and bell crank lever ratio together constituting a powerful reduction gear between the circumferential movement of the pulley and the corresponding microscopic elongation of the specimen.

An elongated flexible member such as a small cable or cord, is looped about the pulley on the screw, and also about a grooved pulley on one end of the drum referred to previously. Both ends of the cable or cord, are provided with weights, but the one end of the cable, for instance that adjacent the drum, has a weight slightly larger than the weight on the end of the cable adjacent the pulley on the screw, from which it follows that the heavier weight normally tends to rotate the drum, together with the pulley and micrometer screw, while the lighter weight keeps the connection under constant tautness. For the purpose of normally preventing rotation of the drum, an electromagnetically operated brake is employed, which cooperates with (one end surface of) the drum. The electro-magnet is in an electrical circuit which includes the contact switch comprising one end of the screw and one end of the bell crank forming part of the device fastened to the metal being tested.

In operating the apparatus described, a sheet of paper is wound about the surface of the drum and fastened in position by any suitable means. As tensile force is applied to the test specimen, the stylus moves longitudinally of the drum and over the paper according to the tensile force. As the metal is elongated, the contact on the bell crank is moved away from the contact on the screw, thereby breaking the circuit including the electro-magnetic brake, which permits the drum to turn. Rotation of the drum a slight amount causes a corresponding movement of the cable trained about the pulley on the screw, until the contact on the latter again engages the contact on the bell crank, thereby again completing the circuit through the electro-magnet, which applies the brake to the drum. It is evident that while the circuit is broken, the stylus moves longitudinally on the drum and at the same time the drum turns. During the testing of the metal, the contacts on the bell crank and screw are rapidly separated by elongation of the strip of metal, and are as rapidly brought into contacting relation by the turning of the drum under the influence of the weights. In this manner, elongation of the metal being tested is indicated by rotation of the drum, although it is greatly magnified, and during the movement of the drum the tensile force imparted to the metal is measured longitudinally of the drum. In view of the fact that the stylus records both of these factors on the paper, it is apparent that stress-strain relation will be automatically recorded as an oblique line or curve.

Due to the large reduction ratio between the circumferential movement of the pulley on the contact screw and corresponding movement of the jaw point on the short end of the bell crank, no extreme care or accuracy is required in installing the cable or cord connecting the chart drum, thus rendering the operation of the apparatus very simple, rapid and practical.

For a better understanding of the invention, reference may now be had to the accompanying drawings, forming part of this specification, in which Fig. 1 is a diagrammatical view of a metal testing apparatus constructed according to the invention;

Fig. 2 is a diagrammatical view of an electrical circuit which is incorporated as a part of the apparatus;

Figure 1:
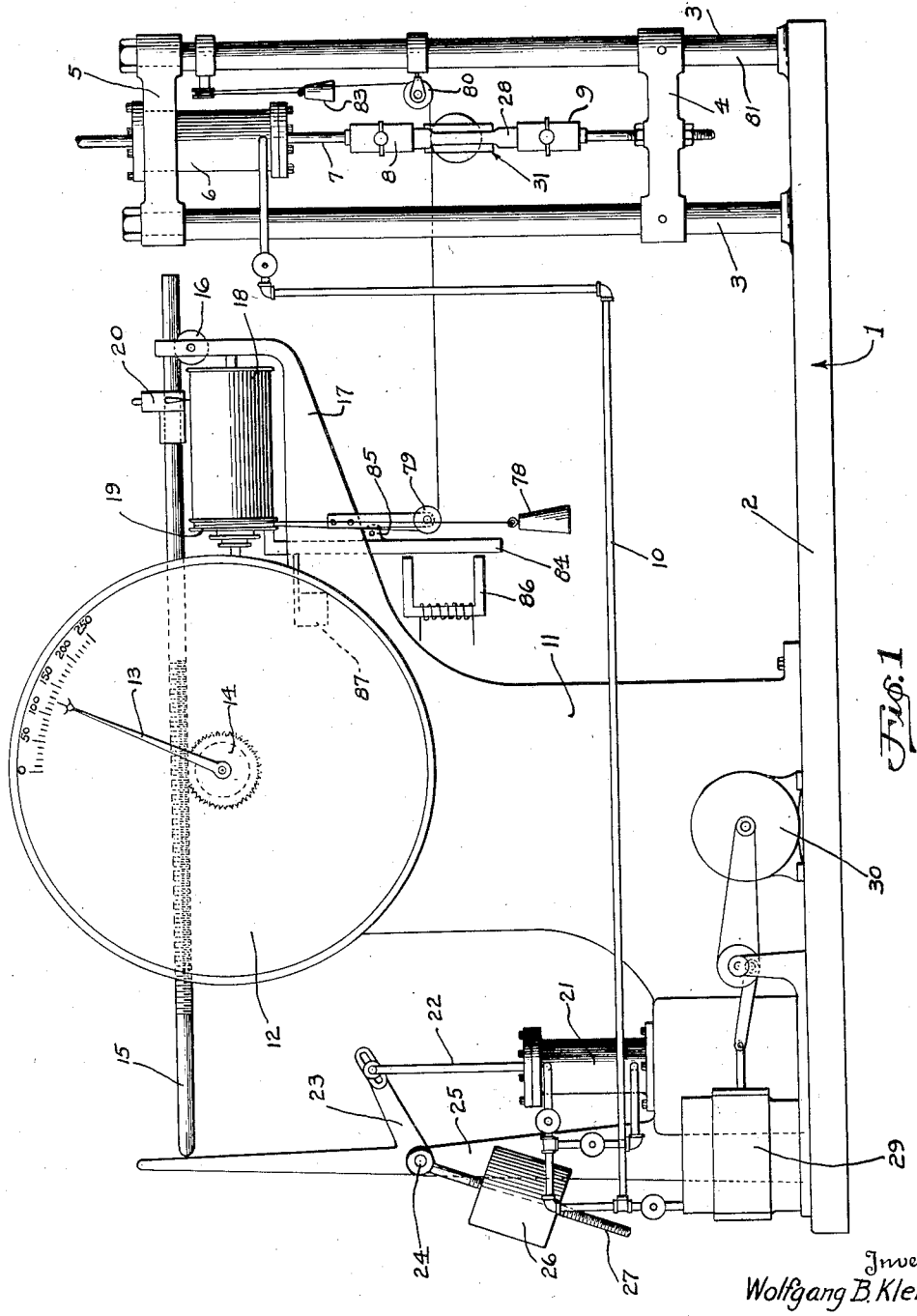

The invention has been illustrated and described in conjunction with a standard type of light weight test mechanism 1 which per se forms no part of the present invention. However, in order that the present invention be better understood, the test mechanism has been diagrammatically shown as including a bed frame 2 upon one end of which are mounted columns 3—3 which carry cross members 4 and 5. Fixed to the cross member 5 is a hydraulic cylinder 6 having a piston rod 7 to which is secured a clamping jaw 8. The cross member 4 adjustably carries a clamping jaw 9 which is adapted to cooperate with the jaw 8 to grip a test specimen or sample 28.

Mounted upon the bed frame 2 is a support 11 to which is secured a dial 12 having a pointer 13 cooperating therewith. The pointer 13 is mounted on a shaft to which is secured a pinion 14 which supports one end of a rack-rod 15. The other end of the rack-rod rides on a roller 16 journaled in the bifurcated end of a bracket 17 secured to the support 11. Journaled in the bracket 17 is a paper carrying drum 18 having a plurality of pulleys 19 of graduated size at one end thereof. Cooperating with the drum is a stylus 20 which is mounted on the rack-rod 15.

The rack-rod 15 is adapted to move in proportion to the weight or force applied to the test specimen and to this end a hydraulic cylinder 21 is mounted on the support 11. The piston rod 22 of the cylinder 21 is secured to one end of a bell crank 23 which is journaled as at 24 to a bracket 25 secured to the support 11. Opposing the action of the hydraulic cylinder 21 is a weight 26 adjustably mounted on a rod 27 fixed to the bell crank 23.

The hydraulic cylinders 21 and 6 are connected together by suitable conduits 10 and to a source of hydraulic pressure which may be provided by a pump 29 driven by a motor 30.

Figure 4:
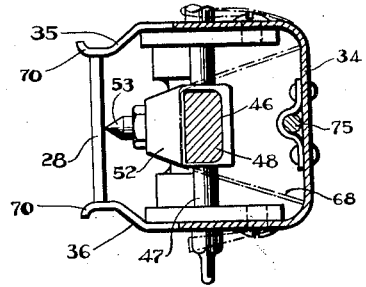
Fig. 4 is a cross-sectional view taken substantially along the lines IV—IV of Fig. 3.
Figure 3:
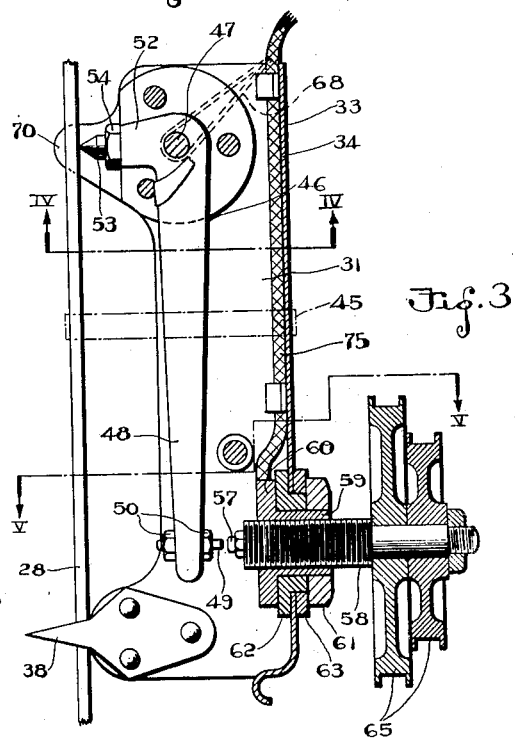
Fig. 3 is a cross-sectional view of a part of the apparatus shown by Fig. 1.
Figure 5:
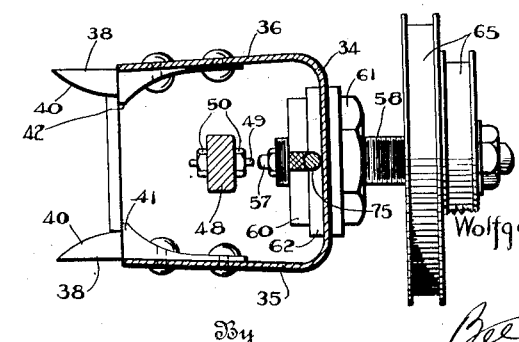
Fig. 5 is a cross-sectional view taken substantially along the line V—V of Fig. 3.

For the purpose of measuring the elongation of the test specimen 28 as the jaw 8 is moved upwardly, a strain gauge or transmitter is fastened to the specimen. As best shown by Figs. 3, 4 and 5, this device comprises a channel frame 33 having a base 34 and flanges 35 and 36. At one end of the frame 34, as best shown by Fig. 5, a pair of blades 38 are provided having sharp edges 40 adapted to engage the specimen 28. Offset portions 41 and 42 serve to locate the specimen in its proper position between the blades. For facilitating the placing of the specimen between the edges 40 of the blades, the former are flared outwardly. When the specimen 28 is positioned between the blades 38, it is necessary to move the flanges 35 and 36 slightly apart, and the contractile resiliency of the flanges causes them to resume their former positions and maintains the knife edges 40 in contact with the specimen 28. This resiliency may also cause the blades to project slightly into the edges of the specimen. For the purpose of additionally securing the specimen 28 in position, an elastic band 45 may be looped about the metal and the frame 34.

At the opposite end of the frame 34, a bell crank 46, having arms 48 and 52 disposed substantially at right angles to each other, is pivoted upon a pin 47, which is journaled at opposite ends in the flanges 36 and 35. One arm 48 of the bell crank 46 projects toward the end of the frame 34 adjacent the blades 38 and is provided with a contact pin 49 which is adjustably secured in the end of the arm by means of lock nuts 50 disposed at opposite sides of the arm, and which engage threaded portions of the pin. The other arm 52 of the bell crank projects toward the test specimen 28, and is provided with a finely pointed pin 53 which is adjustably secured in the end thereof by means of a lock nut 54. The pin 53 is adapted to engage the specimen 28 at a point spaced approximately 2 inches from the blades 38.

A contact 57 adapted to cooperate with the contact pin 49 comprises one end of a screw 58 which is threaded through a sleeve 59 projecting through the base 34 of the frame 33. A flange 60 on the inner end of the sleeve 59 and a nut 61 threaded on the outer end of the sleeve serve to secure the sleeve rigidly to the base 34. The sleeve 59 and the nut 61 are insulated from the frame 33 by insulating washers 62 and 63. The end of the screw 58 projecting outwardly of the frame 33 is provided with a grooved pulley 65 which is rigidly secured thereto. For the purpose of maintaining the contact points 49 and 57 together while securing the gauge 31 to the test specimen 28, a small rubber band 68 is looped about the arm 48 of the bell crank between the pin 47 and the contact 49. The band extends between the pin 47 and the base 34 of the frame 33 and then outwardly of the frame, and has its ends looped about ends of the pin 47 projecting outwardly of the flanges 35 and 36. For the purpose of providing additional means for retaining the specimen 28 in contact with the needle point 53, the flanges 35 and 36 are provided with resilient ears 70 adapted to engage resiliently the edges of the metal. The sleeve 60 is connected to an electrical conductor 75 which is insulated from the frame 33.

Referring to Fig. 1, the test specimen 28 is fastened between the jaws 8 and 9, a sheet of paper is fastened to the peripheral surface of the drum 18, and the stylus 20 is moved to a position adjacent the pulleys 19. Then a servo-motor such as a cable or cord 77 having a counterweight 78 attached at one end, is trained about one of the pulleys 19 on the drum 18, then about a small pulley 79 journaled in a depending portion of the frame 17, then it is looped about the pulley 65, then about a small pulley 80 fastened to the column 3, and then upwardly over a pulley 81 also fastened to the column 3. The end of the cable adjacent the pulley 81 is secured to a weight 83 that is lighter than the weight 78.

In order to normally hold the drum 18 stationary and prevent the weight 78 from rotating the same a brake mechanism is provided which may include a lever 84 pivotally secured to the bracket 17 as at 85, which lever contacts with the end of the drum 18. A solenoid 86 serves to hold the lever in braking position against the action of a counterweight 87.

The operation of the apparatus may be best understood by referring to Fig. 2. As the test specimen 28 is elongated, the pin 53, by its positive engagement therewith, causes the arm 48 of the bell crank 46 to be pivoted in a clockwise direction, as viewed in Fig. 3, and consequently, the contact 49 is moved away from the contact 57. The pin 53 and the blades 38 constitute articulated compassing or rotatable elements and the contacts 49 and 57 constitute two insulated contacts. This breaks an electric circuit 90 which includes the solenoid 86, the latter serving as an operating element for the brake lever 84. Immediately after the circuit 90 is broken, the counterweight 87 secured to the brake lever 84, moves it away from the end of the drum 18, thereby allowing the counterweight 78 to rotate the drum. It should be understood that the rack rod 15 and thus the stylus 20 are moved according to the stress applied to the test specimen 28. This is because the distance the weight 26 is out on the arm 27 and the height to which the weight is raised controls the hydraulic pressure on the cylinders 6 and 21 and accordingly the actual force applied on the test specimen 28 causes a longitudinal movement of the rack-rod 15. Consequently, the distance the stylus 20 is moved longitudinally of the drum 18 indicates the tensile force acting on the test specimen. This force is indicated in pounds, or pounds per square inch, by the pointer 13 cooperating with the dial 12. The pointer 13 is turned by the longitudinal movement of the rack-rod 15 inasmuch as the rack formed by the threads thereon rotates the pinion 14 secured to the pointer 13. When the drum 18 turns, it causes a corresponding movement of the flexible element 77, which in turn rotates the screw 58. The movement of the screw 58 is such that the contact 57 is moved toward the contact 49 and rotation of the drum 18 continues until the two contacts again meet, thereby closing the circuit 90, and again energizing the solenoid 86 which applies the brake 84 to the drum, causing it to cease rotating. It is apparent that during the rotation of the drum 18, the stylus 20 is moving longitudinally thereof, and consequently, the latter moves approximately in a diagonal direction across the surface of the drum. Separation of the contacts 49 and 57 occurs repeatedly, due to elongation of the specimen 28 and reengagement of the contacts follows repeatedly as the drum rotates during each interval that the brake 84 is disengaged from the drum. This operation, of course, causes the stylus to describe a slightly jagged line, but the latter is not so irregular as to mar the practical continuity of the curve described by the stylus. By properly adjusting the speed of loading the specimen, the electrical circuit, and forming the contact surfaces, the current can be made to begin to fade when the pressure between the contact surfaces begins to drop, thereby releasing the brake more or less gradually so that the drum begins to slip and reestablish good contact before it is fully broken, thereby insuring a practically smooth graph.

It should be understood that the electric circuit 90 includes a ground 95 comprising metallic interconnected parts of the apparatus. A lamp 96 connected in parallel with a portion of the circuit 90 indicates the repeated completing and breaking of the circuit, the observation of which assists the operator in properly adjusting the speed of the machine. For example if the test piece is elongated too rapidly the contact 49 will move away from the contact 57 to darken the light 96 and de-energize the solenoid 86. The light 96 will thereafter stay dark because the counterweight 78 will not be able to turn the drum 18, and thus the screw 58, fast enough to allow contact 57 to catch up with contact 49. If on the other hand the light 96 is on practically all the time and only flickers out at considerable intervals the test piece is being elongated too slowly. After a little practice by watching the light 96 the operator learns to run the machine at the best speed regardless of the character of the test piece. A resistance 97 also connected in parallel with the circuit 90 can be employed for the purpose of preventing excessive sparking between the contacts 49 and 57. For the purpose of applying the brake 84 during adjustment of the contact points 49 and 57 at any time, and thereby preventing rotation of the drum 18 during such interval, a conductor 99 is provided between the solenoid and the ground 95, which may be included in this part of the circuit by means of the operation of a switch 100 which provides for disconnecting the contacts 49 and 57 from the solenoid. In other words, when the switch 100 is so operated that the conduits 99 is in the circuit with the solenoid 86, the brake is effectively functioning and the drum is still independent of the condition of the contacts 49 and 57.

Figure 6:
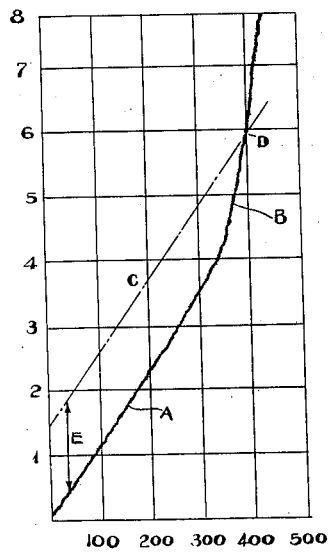
Fig. 6 is a graphic illustration of a stress-strain curve determined by the use of the invention.

Graphic results of using the apparatus previously described are shown by Fig. 6. The base line of the graph represents the tensile force in pounds, or pounds per square inch, to which the test specimen 28 is subjected. The vertical ordinate of the graph represents the elongation of the metal test bar as the tensile force is applied. It should be understood that the ratio between the length of the arm 47 and the arm 52 of the bell crank 46, in conjunction with the flexible element 77 and the pulleys 65 and 19, greatly magnifies actual representation of elongation of the test specimen 28. In a particular application of the invention, this magnification of the elongation of the test specimen 28 was approximately 630. In other words, if the test specimen 28 increases .005 of an inch in length per inch of the bar and the distance of the compassing members is 2 inches, a point on the surface of the drum 18 moves approximately 6.30 inches. The curve "A" of the graph indicates the relation of the stress applied, to the strain in the metal. The slope of the slant portion "A" of the graph indicates modulus of elasticity of the material. The deviation from the modulus slope in region "B" is characteristic of the beginning of plastic yielding. The yield load for any desired degree of yielding can be rapidly read at the intersection "D" of the graph with a straight line "C" drawn parallel to the part "A" at the proper distance "E", according to the magnification of the record. It is obvious that by varying the pulley diameters either on the contact screw or on the drum, any desired magnification can be obtained.

The invention provides a very rapid and accurate means for determining the relation of the stress to strain in metal, and its practical use indicates that this relation may be determined very satisfactorily.

The engaging prongs, the bell crank, the micrometer screw contact and the cord connection to the recorder, which latter, with its motor and brake may be conveniently located independent of the test specimen, are essential features of the present invention, inasmuch as the adoption of this arrangement resulted in an exceedingly small, compact, light and handy instrument adaptable for investigations of small specimens of thin gauge. Although the instrument was described as having a gauge length of 2 inches, its design lends itself to even much smaller dimensions for cases where only limited pieces of material are available or suspected to have special mechanical properties to be explored. The method of synchronizing the chart with the contact movement is, in its simplicity and fool-proofness, a great factor in combining accuracy with inexpensiveness, so that the application of such delicate stress-strain exploration to engineering and production problems becomes vastly facilitated.

It is to be understood that the invention is particularly designed to determine this relation when a tensile force is applied to metal, but that by obvious variations in the apparatus, the relation between a compression stress and corresponding decrease in length of the metal can likewise be determined. Especially it is to be understood that whereas the invention was described with reference to its special application as a strain gauge, it is not limited to recording the relative movement of two portions on one and the same piece of metal, since it may as well be applied, and in fact, lends itself admirably to the recording of small relative motions of two individual members. In this more universal application it must be referred to as a micrometer gauge and the mechanism described as actuating the abscissa movement of the recorder is then to be understood to be actuated by whatever may be the controlled cause of the microscopic movement of the two members under investigation.

What I claim is:

1. An apparatus for determining the stress-strain characteristics of materials comprising a frame adapted to be fastened at predetermined spaced points to a specimen of the material, a bell crank pivoted intermediate its ends to the frame, one end of the bell crank having a needle point for engaging the specimen, an electrical contact switch having one contact thereof comprising the other end of the bell crank, a rotatable screw means carrying the other contact of said switch, an indicating drum, means tending to rotate said drum, an electric brake for holding the drum against rotation, said contacts being in the electric circuit to said brake, and means for rotating the screw means by the rotation of the drum.

2. A micrometer gauge for indicating very small movements of parts of one body or of a plurality of bodies during deformation thereof, comprising a transmitter mechanically secured adjacent to said body or bodies and following said movements, an electric circuit including said transmitter, means in said circuit and incorporated with the transmitter whereby the circuit is broken by a small step in the movements of the body or bodies during said deformation, a separately mounted recorder means including a movable element, an electric brake connected in the electric circuit and holding the element inactive upon completion of the circuit, and a servo-motor operatively connecting the transmitter and element.

3. In a combination for indicating movements of a test specimen, a transmitter adapted to be clamped to the test specimen, a recorder means including a rotatable element, means tending to rotate the element, electrically energized brake means normally holding the element against rotation, an electric circuit including said brake means, switch means in said circuit and on said transmitter for normally closing said circuit to energize said brake means, said transmitter including means for opening said switch means upon attenuation of the test specimen, and means connecting the element and transmitter for closing the switch means upon movement of the element.

4. Gauging mechanism for deformable objects comprising a recorder means including a rotatable element, means tending to rotate the element, brake means normally preventing rotation of the element, an electric circuit for energizing the brake means, switch means for closing said electric circuit, means for opening said switch means upon deformation of the object gauged, and means for closing the switch means upon movement of the element.

5. An apparatus for determining the stress-strain characteristics of materials comprising a frame adapted to be fastened at predetermined spaced points to a specimen of the material, a bell crank pivoted intermediate its ends to the frame, one end of the bell crank having a needle point for engaging the specimen, an electrical contact switch having one contact thereof comprising the other end of the bell crank, a rotatable screw means carrying the other contact of said switch, an indicating member, means tending to move said member, an electric brake for holding the member against movement, said contacts being in the electric circuit to said brake, and means for rotating the screw means by the movement of the member.

WOLFGANG B. KLEMPERER.